US011258597B2

(12) United States Patent
Van Der Sluis et al.

(10) Patent No.: US 11,258,597 B2
(45) Date of Patent: Feb. 22, 2022

(54) KEY DERIVATION FROM PUFS

(71) Applicant: INTRINSIC ID B.V., Eindhoven (NL)

(72) Inventors: Erik Van Der Sluis, Eindhoven (NL); Roel Maes, Eindhoven (NL)

(73) Assignee: INTRINSIC ID B.V., Eindhoven (NL)

( * ) Notice: Subject to any disclaimer, the term of this patent is extended or adjusted under 35 U.S.C. 154(b) by 64 days.

(21) Appl. No.: 16/629,735

(22) PCT Filed: Jun. 20, 2018

(86) PCT No.: PCT/EP2018/066437
§ 371 (c)(1),
(2) Date: Jan. 9, 2020

(87) PCT Pub. No.: WO2019/011607
PCT Pub. Date: Jan. 17, 2019

(65) Prior Publication Data
US 2021/0152349 A1    May 20, 2021

(30) Foreign Application Priority Data
Jul. 10, 2017  (EP) .................... 17180490

(51) Int. Cl.
*H04L 9/08* (2006.01)
*H04L 9/32* (2006.01)
(52) U.S. Cl.
CPC .......... *H04L 9/0866* (2013.01); *H04L 9/0869* (2013.01); *H04L 9/3278* (2013.01); *H04L 2209/12* (2013.01)

(58) Field of Classification Search
CPC ... H04L 9/0866; H04L 9/3278; H04L 9/0869; H04L 2209/12; H04L 9/08; H04L 9/32
See application file for complete search history.

(56) References Cited

U.S. PATENT DOCUMENTS 10,708,073 B2 * 7/2020 Profumo ............... H04L 9/0643
2003/0204743 A1   10/2003 Adas et al.

FOREIGN PATENT DOCUMENTS

| EP | 1 510 914 | 3/2005 |
| EP | 1 610 462 | 12/2005 |
| EP | 1 610 463 | 12/2005 |

(Continued)

OTHER PUBLICATIONS

Patrick Koeberl, et al., "Evaluation of a PUF Device Authentication Scheme on a Discrete 0.13um SRAM", Trusted Systems, Springer Berlin Heidelberg, Nov. 27, 2011, pp. 271-288.

(Continued)

*Primary Examiner* — Quazi Farooqui
(74) *Attorney, Agent, or Firm* — Nixon & Vanderhye, P.C.

(57) ABSTRACT

Some embodiments relate to an electronic cryptographic device (100) arranged to determine a cryptographic key. The cryptographic device is arranged for an enrollment phase and a later reconstruction phase. The cryptographic device comprising a physically unclonable function (PUF) (110) and a processor circuit. The circuit being configured to determine during the enrollment phase debiasing data (142), first noise reduction data (131) and first noise reduction data. The circuit being configured to during the reconstruction phase compute at least one cryptographic key from first corrected bits and second corrected bits.

12 Claims, 6 Drawing Sheets

(56) References Cited

FOREIGN PATENT DOCUMENTS

| EP | 2 191410 | 10/2014 |
|----|----------|---------|
| WO | 2009/024913 | 2/2009 |
| WO | 2011/018414 | 2/2011 |
| WO | 2012/069545 | 5/2012 |
| WO | 2016/102164 | 6/2016 |

OTHER PUBLICATIONS

Patrick Koeberl, et al., "Entropy loss in PUF-based key generation schemes: The repetition code pitfall", 2014 IEEE International Symposium on Hardware-Oriented Security and Trust (HOST), IEEE, May 6, 2014, pp. 44-49.

Roel Maes, et al., "PUFKY: A Fully Functional PUF-Based Cryptographic Key Generator", Correct System Design, Lecture Notes in Computer Science; Lect.Notes Computer, Springer International Publishing, Cham, Sep. 9, 2012, pp. 302-319.

Roel Maes, et al., "Secure Key Generation from Biased PUFs", International Association for Cryptologic Research, vol. Jun. 21, 2015:080549, Jun. 12, 2015, pp. 1-26.

Roel Maes, et al., "Secure key generation from biased PUFs: extended version", Journal of Cryptographic Engineering, Springer Berlin Heidelberg, vol. 6, No. 2, Mar. 15, 2016, pp. 121-137.

J. Von Neumann (Summary by G. Forsythe), "Various Techniques Used in Connection With Random Digits", Journal of Research of the National Bureau of Standards, vol. 5, No. 5, Jan. 1, 1963, pp. 768-770.

International Search Report and Written Opinion of the ISA for PCT/EP2018/066437 dated Aug. 10, 2018, 16 pages.

* cited by examiner

| | | | | | | | | | | |
|---|---|---|---|---|---|---|---|---|---|---|
| 412 | 00 | 01 | 10 | 11 | 10 | 01 | 00 | 11 | 01 | 11 |
| 420 | S0 | U0 | U1 | S1 | U1 | U0 | S0 | S1 | U0 | S1 |

| | | | | | | | | | | |
|---|---|---|---|---|---|---|---|---|---|---|
| 431 | E- | U0 | U1 | E- | U1 | U0 | E- | E- | U0 | E- |
| 432 | 00 | 00 | 00 | 00 | 00 | 11 | 11 | 11 | 11 | 11 |
| 433 | E- | U0 | U1 | E- | U1 | U1 | E- | E- | U1 | E- |

| | | | | | | | | | | |
|---|---|---|---|---|---|---|---|---|---|---|
| 441 | S0 | E- | E- | S1 | E- | E- | S0 | S1 | E- | S1 |
| 442 | 11 | 11 | 11 | 11 | 11 | 00 | 00 | 00 | 00 | 00 |
| 443 | S1 | E- | E- | S0 | E- | E- | S0 | S1 | E- | S1 |

| | | | | | | | | | | |
|---|---|---|---|---|---|---|---|---|---|---|
| 433 | E- | U0 | U1 | E- | U1 | U1 | E- | E- | U1 | E- |
| 443 | S1 | E- | E- | S0 | E- | E- | S0 | S1 | E- | S1 |
| 451 | S1 | U0 | U1 | S0 | U1 | U1 | S0 | S1 | U1 | S1 |
| 452 | 01 | 10 | 11 | 00 | 11 | 11 | 00 | 01 | 11 | 01 |

*Fig. 3*

| | | | | | | | | | | |
|---|---|---|---|---|---|---|---|---|---|---|
| 412 | 00 | 01 | 10 | 11 | 10 | 01 | 00 | 11 | 01 | 11 |
| 514 | 0<u>1</u> | 01 | 10 | 11 | <u>0</u>0 | 01 | 00 | <u>0</u>1 | 01 | 11 |
| 451 | S1 | U0 | U1 | S0 | U1 | U1 | S0 | S1 | U1 | S1 |

| | | | | | | | | | | |
|---|---|---|---|---|---|---|---|---|---|---|
| 521 | E- | U0 | U1 | E- | U1 | U1 | E- | E- | U1 | E- |
| 522 | -- | 01 | 10 | -- | 10 | 10 | -- | -- | 10 | -- |
| 523 | -- | 00 | 00 | -- | 10 | 11 | -- | -- | 11 | -- |
| 524 | 0 | | | | 1 | | | | | |

| | | | | | | | | | | |
|---|---|---|---|---|---|---|---|---|---|---|
| 531 | S1 | E- | E- | S0 | E- | E- | S0 | S1 | E- | S1 |
| 532 | 11 | -- | -- | 00 | -- | -- | 00 | 11 | -- | 11 |
| 533 | 10 | -- | -- | 11 | -- | -- | 00 | 10 | -- | 00 |
| 534 | 1 | | | 0 | | | | | | |

*Fig. 4*

KEY DERIVATION FROM PUFS

This application is the U.S. national phase of International Application No. PCT/EP2018/066437 filed Jun. 20, 2018 which designated the U.S. and claims priority to EP Patent Application No. 17180490.9 filed Jul. 10, 2017, the entire contents of each of which are hereby incorporated by reference.

FIELD OF THE INVENTION

An electronic cryptographic device arranged to determine a cryptographic key, an electronic enrollment method arranged to enroll a device for later determining of a cryptographic key, an electronic reconstruction method arranged to determine a cryptographic key, and a computer readable medium.

BACKGROUND

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular predetermined identifier. The manufacturing variations lead to different physical characteristics of the memory element. For example, the physical characteristics may include: doping concentrations, oxide thickness, channel lengths, structural width (e.g. of a metal layer), parasitics (e.g. resistance, capacitance). When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

The fact that PUFs produce device-intrinsic and unpredictable responses make them a very suitable candidate to generate cryptographic keys from. In contrast to traditional non-volatile key storages, a PUF-based key is not stored in digital format, but stems from small random deviations in the PUF's physical structure. Moreover, the generation of the key itself does not depend on externally provided randomness, which may be of low quality, but uses the high-entropy intrinsic randomness of the device itself. The combination of these factors can lead to highly secure solutions for cryptographic key storage.

Using a PUF, the need for secure memory to store a key may be circumvented. A PUF furthermore provides natural protection against malicious attempts to obtain the cryptographic key through reverse engineering, since damage which could be inflicted to the PUF during the attempt likely changes the digital identifier. Preferably, the digital identifier is unique for the electronic device wherein the physical unclonable function is embedded.

For example, it has been observed that the startup behavior of some memory elements, demonstrate PUF like behavior. When such memory is powered-up, it tends to contain content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content.

A PUF provides unpredictable and device-unique responses, yet due to their physical origin, these may be subject to measurement noise, and environmental influences. Cryptographic keys on the other hand need to be reliable and of full entropy. To bridge this gap, some amount of post-processing on the PUF responses is required. One way to address noise is the use of so-called fuzzy extractors. A fuzzy extractor is able to transform a 'noisy' random value into a reliable key. An error correction procedure can be used in this process to correct for these fluctuations, and make sure an identical digital identifier is derived, each time the PUF is used. The error correction procedure uses so-called helper data. Helper data is also called noise reduction data.

A fuzzy extractor may comprise two stages. In an initial enrollment stage, a cryptographic key is derived from the PUF response. In the enrollment process, helper data or noise reduction data for the PUF response is produced. Later on, e.g., in the field, the reconstruction stage reevaluates the PUF response and uses the noise-reduction data from the enrollment stage to reconstruct the same key. The noise-reduction data hence needs to be stored in between the enrollment and reconstruction stages. The reconstruction stage is sometimes revered to as the use-phase.

A desirable property of a fuzzy extractor in this respect is that the noise-reduction data contains no information about the key which is derived. In other words, the noise-reduction data contains no sensitive information and cannot be used to attack the generated key. As a result, the noise-reduction data can be stored and communicated publicly and does not need shielding from adversaries as a direct storage of the key would need.

The operation of a fuzzy extractor may be based on the use of an error correcting code. Typically, the error correcting code is a block code and is linear, e.g., a linear error correcting block code. During enrollment, the fuzzy extractor calculates noise-reduction data for the PUF response, e.g., by calculating a number of parity relations on the PUF response bits and disclosing these relations in the noise-reduction data. Noise reduction data may be computed, e.g., by calculating the difference between one or more code words and the PUF response. This type of noise reduction data is sometimes referred to as a code word offset.

It was found by the applicant that the information leakage about the key through the noise-reduction data is non-zero if the PUF has a high bias. In fact, if the PUF has very high bias the noise-reduction data may even reveal sufficient information about the key to allow complete reconstruction of the key by an attacker.

Solutions to the problem of potential full entropy loss in situations of high bias are disclosed a publication "Secure key generation from biased PUFs" (See Cryptology ePrint Archive: Report 2015/583, included herein by reference). A shorter version of this paper was also accepted for publication at CHES-2015. According to this article, a solution may be obtained by debiasing a PUF. For example, during enrollment, bias may be reduced by marking bits in the first noisy bit string as retained or discarded. A key is then derived only from the retained bits. As the retained have a lower bias than the entire PUF response, the problem of entropy loss through PUF bias is reduced.

Unfortunately, the solutions presented in the above paper still have some drawbacks.

First of all, the solutions presented discard a large number of bits to obtain a less biased substring of a PUF response. In the straightforward approaches about 50% of the bits in a PUF response are discarded for an unbiased PUF. For a biased PUF the number of discarded bits would be even higher. Recursive application in some of the more refined approaches can reduce this number somewhat, at the costs of a more complicated system. Yet even in those cases, a larger number of bits remain unused. This is problematic, especially in low-resource systems where memory, e.g., SRAM based PUFs, is at a premium.

Second not all the known approaches can be enrolled multiple times. Repeated enrollment is a potential security risk in PUF based systems. If an attacker can force a system to return to an uninitialized state and repeat the enrollment procedure, he may obtain new noise reduction data. Combining the information from the original noise reduction data and the new noise reduction data may allow an attacker to learn more about the PUF response. It is therefore desirable that an enrollment procedure can withstand repeated enrollments. Unfortunately, the recursive approaches mentioned above cannot be combined with the schemes that can resist multiple enrollments.

In other words, traditional helper data uses all PUF entropy, but suffers from reduced entropy due to leakage and becomes insecure when the PUF is biased, up to the point that no entropy is remaining. Different forms of debiasing maintain entropy under bias, even full entropy, but require that a significant part of the PUF entropy is discarded: more than twice the PUF bits are needed. Both approaches have a big downside, one requires significantly more PUF resources, the other can be broken completely when enough bias is present.

There is therefore a desire for a PUF based system in which these and other problems are addressed. Reference is made to International Patent Application PCT/EP2015/078454, published with number WO2016102164 (included herein by reference) which also discloses cryptographic key production from biased PUFs.

SUMMARY OF THE INVENTION

An electronic cryptographic device is provided arranged to determine a cryptographic key. The cryptographic device is arranged for an enrollment phase and a later reconstruction phase. The cryptographic device comprises
  a physically unclonable function arranged to produce a first noisy bit string during the enrollment phase and a second noisy bit string during the reconstruction phase, and
  a processor circuit configured to
    determine during the enrollment phase debiasing data from the first noisy bit string, the debiasing data marking a first part of the first noisy bit string as low bias susceptible, and marking bits in a second part of the first noisy bit string as high bias susceptible,
    determine during the enrollment phase a first noise reduction data for the first part, and a second noise reduction data for the second part, noise reduction data allowing later correction during the reconstruction phase of differences between the second noisy bit string and the first noisy bit string,
    identify during the reconstruction phase a first part and a second part in the second noisy bit string based on the debiasing data,
    perform a first correction of differences between the first part of the second noisy bit string and the first part of the first noisy bit string based on the first noise reduction data thus obtaining first corrected bits, and perform a second correction of differences between the second part of the second noisy bit string and the second part of the first noisy bit string based on the second noise reduction data thus obtaining second corrected bits, wherein the first correction and second correction are independent from each other,
    compute at least one cryptographic key from the first corrected bits and the second corrected bits.

The cryptographic device produces acceptable results both in case of normal bias and in case of higher bias. In case normal bias is present, entropy loss through noise reduction data is small, and both the first and second corrected bits are high in entropy. In case higher bias is present in the PUF output the entropy loss in the first corrected bits is reduced even if entropy loss in the second corrected bits may be severe. Thus, keys are generated without a large increase in PUF resources, but also without the risk of being completely broken when enough bias is present.

The cryptographic key may be used in a number of cryptographic protocols, including encrypting or decrypting information using the cryptographic key, electronic signing of information using the cryptographic key, etc. Cryptographic keys derived from the PUF may be symmetric or asymmetric keys. For example, public/private key pair may be derived from the PUF after which the public key may be exported out of the device. Embodiments of the device and method described in the claims may be applied in a wide range of practical applications. Such applications include: banking card, sim cards, smart cards for pay per view, ID cards, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a cryptographic device, FIGS. 2a-2d schematically show examples of computing at least one cryptographic key from first corrected bits and second corrected bits, FIG. 3 schematically show examples of enrollment, FIG. 4 schematically show examples of reconstruction, FIG. 5 schematically shows an example of an embodiment of an electronic enrollment method 600, FIG. 6 schematically shows an example of an embodiment of an electronic reconstruction method 700, FIG. 7a schematically shows a computer readable medium having a writable part comprising a computer program according to an embodiment, FIG. 7b schematically shows a representation of a processor system according to an embodiment.

List of Reference Numerals, in FIGS. 1-2d 100 an electronic cryptographic device
110 a physically unclonable function (PUF)
112 a first noisy bit string
114 a second noisy bit string
120 a debiasing unit
121 a first low bias susceptible part of the first noisy bit string
122 a second high bias susceptible part of the first noisy bit string
130 a noise-reduction unit
131 first noise reduction data
132 second noise reduction data
140 a storage
142 debiasing data
144 noise-reduction data
150 a key reconstruction unit
151 a first part of the second noisy bit string
152 a second part of the second noisy bit string
160 a normalizer
161 one or more noisy first code words
162 one or more noisy second code words
170 an error corrector
171 first corrected bits
172 second corrected bits
180 a key derivation unit
181-187 a cryptographic key

DETAILED DESCRIPTION OF PREFERRED EMBODIMENTS

Figure 1:
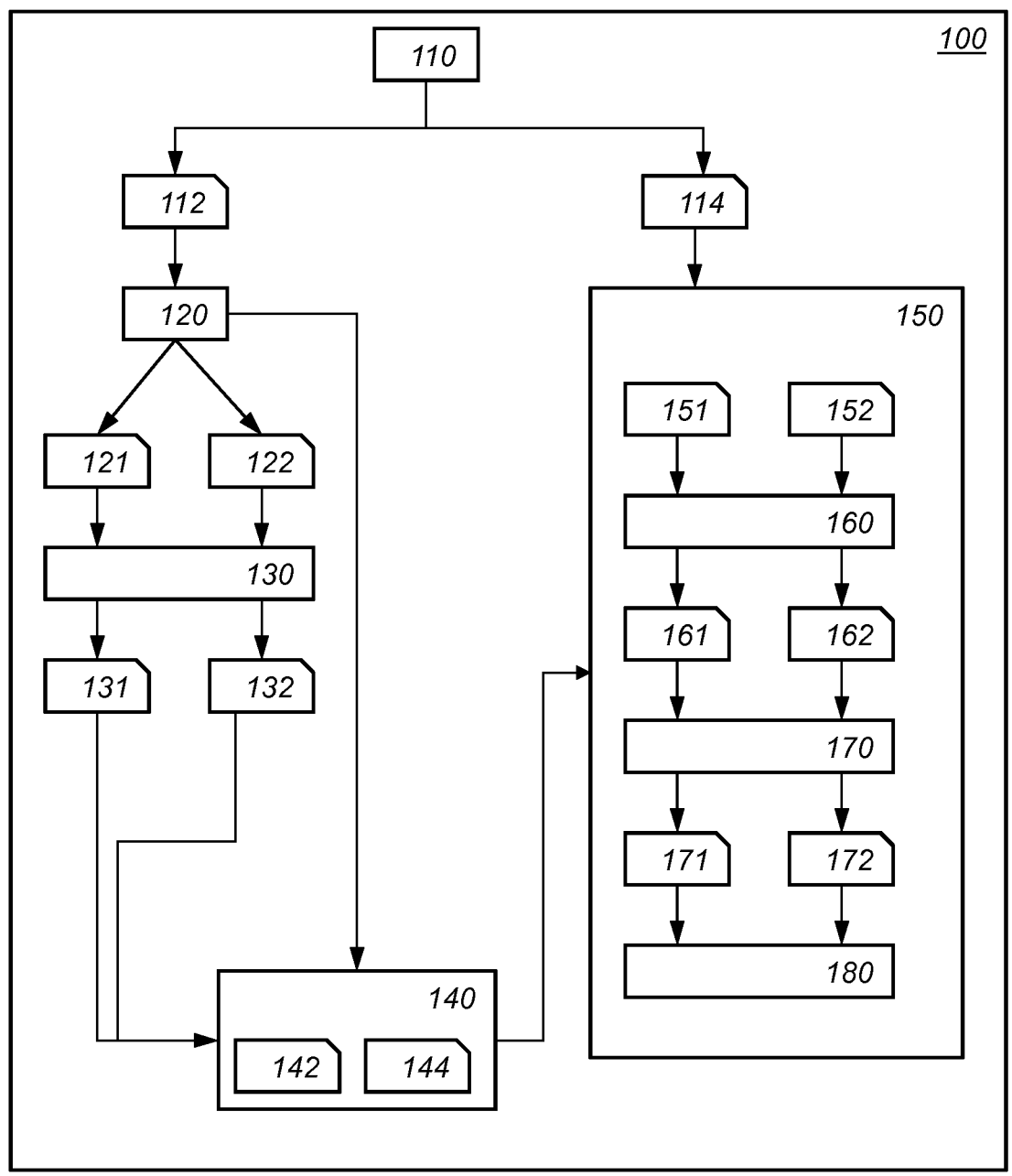

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1 schematically shows an example of an embodiment of a cryptographic device 100.

Device 100 comprises a so-called physically unclonable function 110, usually referred to as a PUF. Device 100 is arranged to determine a cryptographic key. The cryptographic device is arranged for an enrollment phase and a later reconstruction phase. PUF 110 is arranged to produce a first noisy bit string 112 during the enrollment phase and a second noisy bit string 114 during the reconstruction phase. During the reconstruction phase, which may be repeated multiple times, the same cryptographic key is produced. During the enrollment phase, data may be produced which enables the repeated identical production of the cryptographic key and/or reduce bias in the PUF.

Determining a key from a PUF is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may also be wholly or partially be implemented in computer instructions that are stored at the cryptographic device and are executable by a microprocessor of the cryptographic device. In hybrid embodiments, functional units are implemented partially in hardware, e.g., as coprocessors, e.g., crypto coprocessors, and partially in software stored and executed on the cryptographic device.

The amount of change between subsequently produced noisy bit strings differs between different types of PUF; depending on the amount of change an error correcting code may be selected to correct for it. The noisy bit string is stable enough and long enough to produce a cryptographic key. The length of the noisy bit string of the PUF may be chosen with respect to desired key length, the error percentage of the PUF and/or the bias level of the PUF, etc.

PUF 110 may require a power-cycle, e.g., a power-down followed by a power-up to produce the noisy bit string again. The power-up signal may be regarded as a challenge. In device 100, PUF 110 produces the noisy bit string at least twice. Once during the enrollment-phase, PUF 110 produces a first noisy bit string 112. Later during the use-phase PUF 110 produces a second noisy bit string 114. The first and second noisy bit strings are sufficiently close to each other, e.g., the hamming weight of their difference is less than a threshold.

PUFs are random functions bound to a physical device in such a way that it is computationally infeasible to predict the output of the function without actually evaluating it using the physical device. Furthermore, as the PUF is realized by a physical system it is hard to clone. Physical systems that are produced by a production process that is not fully controlled (i.e. that contains some randomness) turn out to be good candidates for PUFs. In an embodiment, PUF 110 and thus cryptographic device 100 may be uniquely identified based on the response provided by PUF 110, and the key derived therefrom. The key may be used as an identifier, identifying the device.

The PUF's physical system is designed such that it interacts in a complicated way with stimuli and leads to unique but unpredictable responses. The stimuli of a PUF are referred to as the challenge. Some PUF allow a larger range of different challenges, producing different responses. A PUF challenge and the corresponding response are together called a Challenge-Response-Pair. However, a PUF may also have a single challenge. PUF 110 may be a single-challenge PUF. PUF 110 may also be a multiple-challenge PUF. In the latter case, PUF 110 is challenged with the same challenge or set of challenges when producing the noisy bit string, in particular the first and second noisy bit string.

A suitable source of PUFs are formed by an electronic volatile memory that contains, upon power-up, a response pattern of power-up values useful for identification of the memory, the response pattern depending on physical characteristics of the memory elements.

One known example of a PUF used to uniquely identify a device is the so-called SRAM PUF, which is based on the fact that, when an SRAM cell is started-up it starts up in a random state due to variations in the threshold voltages of the transistors, which, in turn, are due to doping variations. When this is done multiple times, each cell will start up in the same state most of the time. These PUFs may be realized on any device having SRAM memory on board.

Any memory showing a random start-up behavior which is sufficiently stable for identifying the memory is called a challengeable memory. As the start-up behavior is random, two different memories will have a large difference in their start-up memory pattern; as the start-up behavior is stable two start-up memory patterns of the same memory will have a small difference. Examples of such memories are SRAM memory cells as mentioned but also memory elements like flip-flops. Actually, any type of volatile memory may be used that comprises feedback loops.

A second kind of SRAM based PUFs can be constructed with Dual Port RAM. By writing on both ports at the same time different information, the memory cell is brought into an undefined state and shows a PUF-like behavior. This kind of PUF is described in more detail in WO2009024913. Other so-called Intrinsic PUFs are based on delay phenomena, see, e.g., US20030204743. A PUF may be constructed by simulating an SRAM memory cell on an FPGA, e.g., by cross-coupled invertors or latches, the so-called butterfly PUF see European patent EP2191410 B1 and WO2011018414A2. PUF 110 may be a physical unclonable function comprising a plurality of bus-keepers, e.g., as described in WO2012069545.

Device 100 comprises a debiasing unit 120. Debiasing unit 120 is arranged to determine during the enrollment phase debiasing data 142 from the first noisy bit string. The debiasing data marks a first part 121 of the first noisy bit string 112 as low bias susceptible, and marks a second part 122 of the first noisy bit string (112) as high bias susceptible. For example, first part 121 has a lower bias compared to string 112. First part 121 may even be unbiased. For example, the bits in a first part 121 of the first noisy bit string 112 may be marked as low bias susceptible, if they have a lower bias, or even less or equal bias, than the bits in the second part 122 of the first noisy bit string 112, which can then be regarded as high bias susceptible. For example, the debiasing data may mark the first part 121 and/or the second part 122 by marking, e.g. identifying or selecting, their bits.

In this application bias refers to the situation in which one of the 1 or 0 bits are more likely than the other one of the 1 or 0 bits. For example, bias of a PUF could be defined as the absolute difference between the probability of producing a 1 bit and the probability of producing a 0 bit. Bias could also be defined as the maximum of the probability of a 1 bit and the probability of a 0 bit. Bias may be determined for a certain bit location by comparing multiple devices. Typically, bias is uniform for larger portions of bit locations. For some PUFs, especially memory based PUF there may be some variation in bias across the memory. For example, bias can vary across a memory, but be constant for larger zones; for example, the first and second half of the memory may each have constant bias but differ from each other. Bias may also vary locally, for example, some memories show a difference in bias for even and odd bit locations.

A PUF which has a low bias will, at least on average produce a bit string, in which the absolute difference between the fraction of 1 bits and the fraction of 0 bits is small. The fraction may be taken as the number of 1 or 0 bits respectively, divided by the length of the string.

The debiasing data is selected so that the first part of outputs of PUF 110 after debiasing have lower bias than the immediate responses of PUF 110. In an embodiment, the debiasing unit 120 is arranged so that the absolute difference between the fraction of 1 bits and the fraction of 0 bits among the bits of the first bit string marked by the debiasing information as retained is smaller than among the first noisy bit string. In an embodiment, the debiasing unit 120 may be arranged to select the first part so that the absolute difference between the fraction of 1 bits and the fraction of 0 bits among the bits of the first bit string marked by the debiasing information as retained, is zero.

Note that lower or higher bias susceptibility is a property of the collection of selected bits. Even if individual bits may share the same susceptibility per se, by combining suitable combinations of 1 and 0 bits, an overall lower bias susceptibility is achieved.

In a simpler embodiment, the debiasing unit may be arranged with a predetermined number k, less than the bit length of the PUF responses. The number is chosen so that, taking account of bias, PUF 110, will have a high probability to have at least the number k 0 bits and at least k 1 bits. In fact, for any practical bias, this probability may be arbitrary high, assuming the bit length of the PUF responses may be taken sufficiently high.

The debiasing unit may be arranged to select the first part by randomly selecting k 0 bits and k 1 bits from among the bits in the first PUF response 112 as retained, discarding all others. Debiasing data 142 indicates which bits were marked as retained and discarded during the enrollment phase. This information may be recorded in a number of ways. For example, debiasing data 142 may comprise a bit mask to indicate the retained bits. The retained bits may later be selected with, say, a bit-wise 'and' operation. For example, debiasing data 142 may include a list of indices pointing to selected bits.

This method of randomly selecting k 0 bits and k 1 bits works to reduce or even remove bias still suffers from a few drawbacks. First of all, since exactly k 0's and 1's are selected, the unpredictability (i.e. entropy) is effectively a little reduced, because an attacker knows that there are exactly k 0's and 1's; in a truly random string that would not necessarily be the same number of 0 and 1 bits. Furthermore, one may use a stochastic method for randomly selecting 0's and 1's. However, an independent randomness source may not be available. Some of the embodiments below do not require independent randomness sources but use the inherent randomness in the bit strings for this.

Finally, if the bias is not uniform, some of the non-uniformity may survive in the "debiased" bit string. For example, if there is a location-dependent bias in the PUF, say a first portion of the PUF response has a different bias as a second portion of the PUF response (e.g. one half of responses is biased to 0, the other half to 1), then this method might not be able to remove that, i.e. the "debiased" bit string would still have the same location-based bias. Embodiments shown below do not suffer from this weakness since they debias locally.

After the first part of output 112 has been selected the second part may be defined as the rest of PUF response 112. Typically, only a first part and a second part is used, but in an embodiment, there may be more than two parts. For example, a first part may have the lowest bias, a second part a lower bias and the third part the highest bias. The debiasing data indicates which bits in the first nosy bit string 112 are part of the first part, second part, etc. In this case, an independent secret may be generated for each part, and noise reduction data computed therefrom for each part, during enrollment.

Debiasing data may for example comprise indices that indicate one or more bits in first noisy bit string. For example, an index in a string may be a location in a bit string, e.g., an address according to some bit addressing scheme. For example, bits may be numbered consecutively, e.g., from LSB to MSB or vice versa, etc. Debiasing data may comprise a bit-mask, that identifies bits in the various parts, etc. The debiasing data is determined from the bit content of first noisy bit string 112, however once determined the debiasing data addresses the bits in the various parts independent of the content of a bit string. This property allows the debiasing data to be applied later to a second noisy bit string.

A particular advantageous way to select the first part is to view the first noisy bit string as a sequence of bit-pairs. The debiasing data assigns some of the bit-pairs to the first part and some to the second part.

For example, the first and second noisy bit string may be partitioned in a first and second sequence of bit pairs respectively. Debiasing unit 120 may be configured to identify bits in unequal bit pairs in the first sequence of bit pairs as low bias susceptible, and to identify bits in equal bit pairs in the first sequence of bit pairs as high bias susceptible. Even if the probability of a one bit is $p \neq \frac{1}{2}$, the probability of the unequal pairs 01 and 10 is the same $p(1-p)$. This method will be expanded upon further below with reference to FIGS. 3 and 4.

By selecting only unequal pairs for the first part it is guaranteed that the first part will have zero bias. It could happen, although it is fairly unlikely, that the second part also happens to have zero bias, e.g., if the number 00 equal pairs is the same as the number 11 equal pairs. This is not a problem, in this case the low bias susceptible first part has less-or-equal bias than the high bias susceptible second part.

Device 101 comprises a noise-reduction unit 130. Noise-reduction unit 130 is arranged to determine during the enrollment phase a first noise reduction data 131 for the first part, and a second noise reduction data 132 for the second part. Noise reduction data allows later correction during the reconstruction phase of differences between the second noisy bit string and the first noisy bit string. Noise reduction data is determined during the enrollment phase, i.e., before the reconstruction phase.

Optionally, device 100 comprises a storage 140, say a non-volatile writable memory, say a Flash memory, for storing debiasing data 142 and noise-reduction data 144. Noise-reduction data 144 comprises both the first noise reduction data 131 for the first part, and the second noise reduction data 132 for the second part. Instead of a storage 140 comprised in device 100, an embodiment stores debiasing data 142 and noise-reduction data 144 externally. Debiasing data 142 and noise-reduction data 144 may be combined into a single bit string.

One way to determine noise reduction data is, the so-called Code-Offset method based on error-correcting codes. Correction using such noise reduction data may use a combination of a normalizer and an error corrector, and is sometimes referred to as a fuzzy extractor. Key derivation may also be included in the fuzzy extractor.

For example, in the enrollment stage, noise reduction unit 130 may select one or more first code words from an error correcting code and one or more second code words from an error correcting code. Typically, the first code words and second code words are selected from the same error correcting code, but this is not needed; they may instead be selected from a distinct first error correcting code and a second error correcting code respectively.

The error correcting code may be regarded as a set of bit strings (code words) that have a positive minimum hamming distance. The error correcting code may have an encoding algorithm to map messages into one or more code words from the error correcting codes, a decoding algorithm to perform the reverse mapping and a correcting algorithm that maps noisy code words to the closest actual code words. The decoding and correcting algorithm may be combined if desired. In error correcting a distinction is made between errors and erasures. There is an error in the noisy bit string if a bit differs from the corresponding bit in the closest code word. In case of an error the position of the error is unknown. There is an erasure if the value of a particular bit in a noisy code word is unknown. Error correcting codes can correct both errors and erasures, but since less information is lost, error correcting codes can typically correct more erasures than errors.

One or more random code words may, e.g., be selected from a code, e.g., by encoding a randomly selected seed. Random code words may also be directly selected, etc.

Noise reduction unit 130 may be arranged to determine the first noise reduction data by computing the offset, e.g., a difference, e.g., an XOR, between corresponding bits in the first part of the first noisy bit string and a corresponding bit in the one or more first code words. Likewise, noise reduction unit 130 may be arranged to determine the second noise reduction data by computing the offset between corresponding bits in the second part of the first noisy bit string and the corresponding bits in the one or more second code words. The first noisy bit string may be padded or shortened if needed to make it a multiple of the code word size.

For example, the offset may be computed between bits in the first or second part of the first noisy bit string and the bits in the one or more first or second code words that have the same index in these respective strings. In an embodiment, the one or more first code words and the one or more second code words have the same length. Preferably, the one or more first code words are as long or longer as the first noisy bit string and so are the one or more second code words. In this case, each bit in the first noisy bit string corresponds to a bit in the one or more first code words and to a bit in the one or more second code words, e.g., the bit with the same index, e.g., bit address, in the string.

It is advantageous to compute the offset between the first or second part on the one hand, and one or more first or second code words that are as long as the entire first noisy bit string, and not just as long as the first or second part thereof. For example, noisy reduction unit 130 may be arranged to determine the offsets between the first noisy bit string and the one or more first code words only for the bits in the first part of the first noisy bit string, and to determine the offsets between the first noisy bit string and the one or more second code words, but only for the bits in the second part of the first noisy bit string. When computing the offset between such one or more first code words and the first part, noise reduction unit 130 may in effect compute the offset between the entire first noisy bit string 112 and the one or more first code words, but ignore those bits in the first noisy bit string 112 that are in the first part. The first noise reduction data 131 may be of the same length as the first noisy bit string, and comprise an offset for the bits corresponding to the first part, and indicate an erasure, e.g., an erasure symbol or an erasure string, etc., for bits corresponding to the second part. The second noise reduction data may be computed likewise, with the roles first and second reversed.

In an embodiment, the first noise reduction data has an offset for each bit in the first part of PUF response 112 and an erasure for each bit in the second part, and vice versa for the second noise reduction data. Computing noise reduction data for the whole of the first PUF response 112, but with bits in the second or first part ignored as erasures leading to first or second noise reduction data with erasures in it, leads to better results than just computing noise reduction data for only the bits in the first part or second part. For example, one could do the latter by forming first and second derived PUF responses by concatenating the bits in the first and second part respectively, and next compute noise reduction data for the first and second derived PUF responses.

It is important that high-bias bits and low-bias bits are not used in the same error correcting code word. Due to the nature off error correction codes, knowing part of the code word allows you to fill in a missing part. If you leak low-bias bits of a code word, this will allow you to fill in (part of) the high-bias bits. But, if you explicitly separate the code words, low-bias bits can only leak low-bias bits and not high-bias bits.

In an embodiment, the noise reduction unit 130 does not compute the offset between a bit in the first part of the first noisy bit string and a corresponding bit in the one or more second code words, or the offset between a bit in the second part of the first noisy bit string and a corresponding bit in the one or more first code words.

Computing noise reduction data for all bits in the first noisy bit string, whether in the first part or in the second part improves resistance against re-enrollment attacks. For example, the re-enrollment attack requires bias to reduce the entropy of the search space. However, because the scope in which bits leak is contained (low-bias, not high-bias), the entropy cannot be fully reduced.

There are alternative ways to construct noise reduction data than the code-offset method. For example, the PUF output may be regarded as the data bits for which parity bits are computed according to an error correcting code. The parity bits are stored as noise reduction data. To reconstruct the PUF response, the same parity bits are computed for the new PUF response and compared with the stored parity bits. From the difference between the parity bits, the difference between the first and the second noisy PUF response bits can be decoded, and the first PUF response can be reconstructed by correcting the second PUF response accordingly. This construction is sometimes referred to as syndrome-construction helper data. This may be combined with debiasing as indicated.

Cryptographic device 100 further comprises a key reconstruction unit 150. In embodiments, a cryptographic device 100 need contain only enrollments units, e.g., debiasing unit 120, noise reduction unit 130 or reconstruction units, e.g., key reconstruction unit 150. For example, if cryptographic device 100 is software based it could be configured to delete the software for enrollment units after enrollment is complete. For example, cryptographic device 100 could download software implementing reconstruction unit 150 after enrollment is complete, e.g., replacing enrollment units. Removing enrollment units after enrollment is complete has the advantage that re-enrollment attacks are more difficult to execute. In FIG. 1 an embodiment is illustrated in which enrollment and reconstruction units are present at the same time, even though they are used in different phases.

Key reconstruction unit 150 is arranged to determine a cryptographic key from bits in the second noisy bit string using the debiasing and noise reduction data. Key reconstruction unit 150 is configured to obtain from PUF 110 a second noisy bit string 114. Second noisy bit string 114 will be close but not (most likely) identical to first noisy bit string 110. With an increased noise level of PUF 110 the minimum distance of the error correcting codes is also increased until a level of reliability is achieved that is compatible with the intended application.

Key reconstruction unit 150 is configured to identify during the reconstruction phase a first part 151 and a second part 152 in the second noisy bit string 114 based on the debiasing data. For example, key reconstruction unit 150 may be arranged to select from second PUF response 114 the bits marked as in the first part and to select the bits marked as in the second part by debiasing data 142. In this way, a first part of the second noisy bit string 151 and a second part of the second noisy bit string 152 is obtained. In an embodiment, strings 151 and 152 retain the bits from second noisy bit string 114 that are in the first respectively second part and marks as an erasure the bits that are in the second respectively the first part.

Key reconstruction unit 150 is configured to perform two corrections: a first correction of differences between the first part of the second noisy bit string and the first part of the first noisy bit string based on the first noise reduction data, and a second correction of differences between the second part of the second noisy bit string and the second part of the first noisy bit string based on the second noise reduction data. The correction uses a type of error corrections compatible with the chosen type of noise reduction data. Below we will assume that the code-word offset method is used, but different types of noise-reduction data are possible. Through the corrections, first corrected bits 171 and second corrected bits 172 are obtained. There are at least three options for corrected bits: they may be first or second code words selected during enrollment, they may be decoded first or second code words selected during enrollment after decoding, and they may be bits of PUF response 112. Using code words or decoded code words is preferred, as it seems to be more efficient. However, in different use-cases other trade-offs may be more efficient.

The amount of entropy in a code word and in a decoded code word is the same, so for deriving a key it does not much matter which one is taken. One may skip the decoding step and directly compute the key from the code words. For implementation, it may be easier to decode, e.g., if a concatenated code is used which has two or more correcting stages. In the latter case a key is directly computed from the corrected code words.

The first correction and second correction are independent from each other, and could e.g., be performed in parallel. In particular, the second correction of high bias susceptible bits does not influence the correction of low bias susceptible bits. Finally, at least one cryptographic key is derived from the first corrected bits and the second corrected bits. Below multiple options are discussed with reference to FIG. 2a-2d.

In case the code word-offset method is used, device 100 may comprise normalizer 160. Normalizer 160 is configured to obtain one or more noisy first code words 161, by applying the first noise reduction data 131 to bits in the first part 151 of the second noisy bit string, and marking as erasures-bits, the bits in the one or more noisy first code words corresponding to bits in the second part of the second noisy bit string. Likewise, normalizer 160 is configured to obtain one or more noisy second code words 162, by applying the second noise reduction data 132 to bits in the second part 152 of the second noisy bit string 114. For example, the noise reduction data may be applied by adding, e.g., XOR-ing, the noise reduction data to the relevant bits. Bits in the wrong part of second PUF response 114 may be ignored or marked as an erasure. If erasures are used in noise reduction data, then the entire noise reduction data can be added to the second PUF response 114, with the proviso that an erasure plus any bit (0 or 1) equals an erasure.

The first and second noisy code words will look similar to the original one or more first and second code words respectively since they are obtained from a second PUF response 114 that is similar to the first PUF response 112. Differences may be caused by two sources: some bits may be wrong due to errors caused by the PUF, some bits may be marked as an erasure caused by the debiasing data.

Key reconstruction unit 150 comprises an error corrector 170 to correct the one or more first noisy code words 161, and to correct the one or more second noisy code words 162. Error corrector 170 is configured to correct both errors and erasures. In general, a linear block code can correct t erasures and e errors provided that $2t+e<d$, wherein d is the minimum distance of the error correcting code. Based on the error rate and bias of PUF 110, a value of d can be computed so that the above inequality holds with a sufficiently high probability. The error rate and bias can be measured empirically by repeatedly measuring PUF outputs from PUF 110, or from a batch of similar PUFs, etc. A suitable value of d could also be obtained experimentally; e.g., increasing d until the system is sufficiently reliable. Differences between the first and second PUF response are imported in the noisy code words by applying the noise reduction date and corrected in the latter by error corrector 170.

Device 100 may comprise a key derivation unit 180. Key derivation derives a cryptographic key from the outputs of error corrector 170. For example, key derivation unit 180 may apply a key derivation function to one or more corrected code words or to decoded code words, etc. Alternatively, key derivation unit 180 may apply a key derivation function (KDF) to the decoding of one or more corrected code words, or to the corrected PUF response bits, or to decoded code words Examples of such key derivation functions include KDF1, defined in IEEE Std 1363-2000, NIST-SP800-108 and 56-C, and similar functions in ANSI X9.42, etc. The key derivation function may be a hash function. Further examples are discussed with reference to FIGS. 2a-2d.

Note that key reconstruction unit 150 does not perform a new debiasing operation, which could result in a new selection which may be quite different from the original selection. Instead, reconstruction unit 150 applies the debiasing data obtained during the enrollment phase. For example, the debiasing data may be stored, e.g., locally at device 100, or externally, say in a server which may be connectable to device 100, say over an electronic data connection.

Suitable error correcting codes may be obtained from a concatenated code construction. In such a construction, the bits of one or more code words a from an error correcting code A (the outer code) are encoded, e.g., as if they were messages, according to an error correcting code B (the inner code). For example, noise-reduction unit 130 may be arranged to select the one or more first or second code words from a first or second error correcting code by encoding one or more further code words from a further error correcting code. The inner code of the error correcting code is advantageously a repetition code. Such a code has the advantage that it has a very high minimum distance and very fast error correction, both for errors and erasures. The outer code may have a lower minimum distance and higher error correction complexity, e.g., a Reed-Solomon code. An example of such a code construction is given in WO2016/102164, e.g., with respect to FIGS. 6c and 6d. That patent application also provides how such codes may be decoded. In an embodiment, the inner code has code words of even length.

Device 100 may comprise a communication interface, e.g., an input interface and/or an output interface. For example, the communication interface may be configured to receive an encrypted message, which, e.g., device 100 may decrypt using a key derived from PUF 110, or an authentication request, to which device 100 may respond using a key derived from PUF 110, etc. For example, device 100 may send a message that is encrypted and/or authenticated using a key derived from PUF 110. The communication interfaces may be selected from various alternatives. For example, the communication interface may be a network interface to a local or wide area network, e.g., the Internet, a storage interface to an internal or external data storage, a keyboard, an application interface (API), etc.

Device 100 may have a user interface, which may include well-known elements such as one or more buttons, a keyboard, display, and/or a touch screen, etc. The user interface may be arranged for accommodating user interaction for performing protected communication, e.g., protected for confidentiality and/or integrity.

Storage 140 may be implemented as an electronic memory, say a flash memory, or magnetic memory, say hard disk or the like. Storage 140 may comprise multiple discrete memories together making up storage 140. Storage 140 may also be a temporary memory, say a RAM. In the case of a temporary storage 140, storage 140 contains some means to obtain data before use, say by obtaining them over an optional network connection (not separately shown).

Typically, the device 100 comprises a microprocessor (not separately shown in FIG. 1) which executes appropriate software stored at device 100; for example, that software may have been downloaded and/or stored in a corresponding memory, e.g., a volatile memory such as RAM or a non-volatile memory such as Flash (not separately shown). Alternatively, device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, cryptographic device 100 comprises a debiasing unit circuit, a noise-reduction unit circuit, a storage circuit, a key reconstruction unit circuit, a normalizer circuit, an error corrector circuit, and a key derivation unit circuit. The circuits implement the corresponding units described herein. The circuits may be a processor circuit and storage circuit, the processor circuit executing instructions represented electronically in the storage circuits. The circuits may also be, FPGA, ASIC or the like.

Embodiment may use a smaller PUFs and still have keys that have sufficient entropy even in the face of bias. For example, if the PUF is an SRAM based PUF, less SRAM is needed. For example, this may be employed in a device with limited resources, e.g., sensor networks having multiple sensor Node. A sensor node comprising a cryptographic device, e.g., as in FIG. 1. For example, the cryptographic device can be a network node, using the derived key to communicate, e.g., with other network nodes in the network.

FIGS. 2a-2d schematically show examples of computing at least one cryptographic key from first corrected bits and second corrected bits. The figures show first corrected bits 171 and second corrected bits 172. For example, first corrected bits 171 may be corrected noisy code words 161, that is first corrected bits 171 may be one or more code words. The corrected code words may be decoded, but this is not needed. If the code words are decoded, then first corrected bits 171 are not code words but could be a random string, e.g., the random seed used during enrollment to generate noise reduction data 131. The same holds for second corrected bits 172. A key derivation function is not strictly necessary in the latter case, but is in any case recommended. If a key derivation function is used, it does not matter if the corrected code words are decoded, and so, this step may be skipped.

Figure 2A:
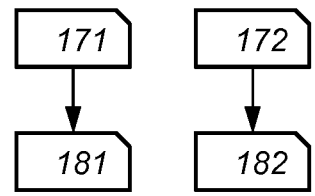

FIG. 2a shows a first embodiment. As shown two cryptographic keys are derived, a first key 181 from first corrected bits 171, and a second key 182 from second corrected bits 182. First key 181 is ultimately derived from bits in PUF 110 that were marked as low bias susceptible during enrollment. As a result, high bias in the PUF 110 has less impact on key leakage through noise reduction data for key 181. In other words, the entropy in key 181 is linked to the entropy in PUF 110; even if the bias in PUF 110 is high, an 'entropy meltdown' in case of high bias is avoided. This may be referred as an entropy baseline. For key 182 there is no such link. This is not to say that key 182 is necessarily worthless. In production systems, most of the PUFs will have acceptable bias. In such a case both key 181 and key 182 will have positive entropy derived from the entropy in PUF 110. In the, hopefully rare, case where PUF 110 has high bias could the entropy for key 182 be reduced, or even disappear altogether. In such a situation key 181 continues to retain some of the entropy present in PUF 110, even if key 182 has been comprised. For example, keys 181 and 182 may be used for different purposes. For example, key 182 may be used for a low-security application, in which protection is preferred, but not an absolute requirement, whereas key 181 may be used for applications in which security is more paramount.

Figure 2B:
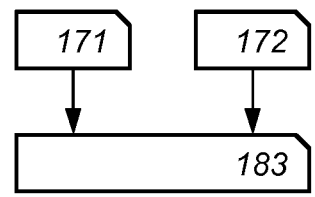

FIG. 2b shows a second embodiment. A single key 183 is derived from both first corrected bits 171 and second corrected bits 172. For example, corrected bits 171 and 172 may both be inputted to a KDF. For example, corrected bits 171 and 172 may be concatenated and hashed, possibly after concatenation of a salt of distinguisher. Key 183 may be used for a cryptographic application. A derived key, like key 183 may be used as a master key from which keys for various applications are derived.

An advantage of key 183 is that a large part of the entropy of PUF 110 is harnessed into key 183. This is considered an important advantage. In normal situations, with acceptable bias, the entropy in key 183 will be very high, e.g., as high as the entropy of PUF 110 allows. In embodiments, it is possible to obtain near full entropy for a key, such as key 183 derived from a PUF. Interestingly, in the situation that bias is high, the contribution of bits 172 will reduce even to the point of zero entropy. In that case, the entropy loss in key 183 may be reduced but bottoms out, as the entropy in string 171 is base lined. Embodiments according to FIG. 2b combine high entropy in practical situations with a minimum or rescue entropy in case of problematic PUFs. The inventors found that the embodiments according to FIG. 2b are well suited to financial applications, such as credit cards.

In such situations, a full entropy loss would be very detrimental, even for rare cases. Yet the system could remain functional so long the keys have some minimal entropy even in case of higher bias. For example, it may be desired by an application that key 183 has close to 256 bits entropy. It would be much preferable in which the entropy occasionally drops to, say, 80 bits entropy, than one where entropy occasionally drops to, say, 0.

Although the system of FIG. 2b uses the entire second PUF output 114 to compute key 183, the construction of FIG. 2b should be distinguished from a conventional system in which the noise reduction data is computed directly for the entire first PUF output 112. In the latter system, a bias increase will cause entropy loss for the eventual key. Even modest out-of-spec bias could significantly reduce the entropy in the resulting key. In an embodiment, an unbiased part of PUF 110 is harnessed to compute a higher quality core, in this case bits 171 which protect key 183 from such an entropy loss.

Figure 2C:
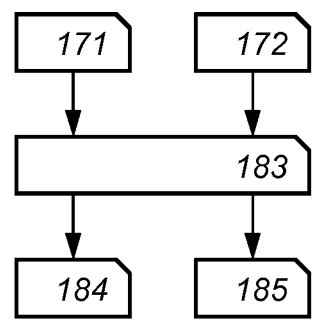

Of course, if the bias is extreme, e.g., a PUF response which consists of nearly only zero's, the entropy in the PUF response will be very low and it cannot be expected that a secure key is derived in the end. Such situations are however both fairly rare and easily spotted. For example, device 100 may check the PUF response with a statistical random number test for a minimum entropy level. For example, device 100 may verify that neither the first part nor the second part is smaller in length than some percentage of the PUF response, say less than 40%. In those cases, the key enrollment may be aborted. It is especially in situations in which a bias increase is more modest that care should be taken not to lose too much entropy through the noise reduction data. Note that the percentage scales with the PUF size. The entropy of the selected bits should, on the one hand, have enough entropy to be secure, but on the other hand contain enough information (non-erasure symbols) to allow for good error correction. In extreme cases signal to noise ratio will be so bad that it will be practically impossible to perform error correction FIG. 2c shows a third embodiment building on FIG. 2b. In FIG. 2c, key 183 is computed as in FIG. 2b but is used as a master key. From master key 183, a first key 184 and a second key 185 is computed. The first and second key 184 and 185 have the same property as key 183, e.g., increased resistance against entropy loss in case of increased bias of PUF 110.

Figure 2D:
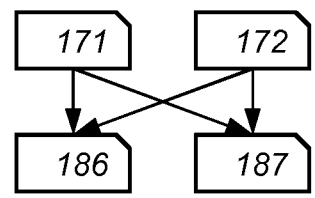

FIG. 2d shows a fourth embodiment. A first key 186 is computed from part of bits 171 and parts of the bits in 172. A second key 187 is also computed from part of bits 171 and part of bits 172, but possibly other parts. For example, bits 100-200 of bits 171 and bits 50-130 of bits 172 may be inputted to a KDF to obtain key 186, and, say, bits 50-100 of bits 171 and bits 130-200 of bits 172 to obtain key 187. An advantage of the construction of FIG. 2d is that more control is possible over which keys have more entropy than others. For example, the keys 184 and 185 are related (even though in practice this relationship is highly convoluted due to the key derivation functions used), this can be avoided by using different parts of bits 171 and 172 for different keys. By varying the percentage of bits used from bits 171, keys can be constructed of different security levels. For example, some keys may be generated entirely from bits taken from bits 171, whereas other keys only receive a smaller percentage of bits from bits 171.

FIG. 3 schematically show examples of an enrollment procedure. The procedures illustrated with FIG. 3 may be executed, e.g., on an embodiment such as that illustrated with FIG. 1. FIGS. 3 and 4 shows (at least part of) strings that may occur in an implementation of enrollment or reconstruction. In an embodiment, the strings, including the PUF response, may be larger, even much larger. In an embodiment, the PUF response comprises at least 1000 bits. Still larger may also be used, e.g., at least 2000 bits, 4000 bits, etc.

The process starts with a PUF response 412 from which pairs are formed, so that we have a sequence of bit pairs. In this case, pairs are consecutive but this is not necessary. The equal pairs are marked in string 420 bias-susceptible (S) and unequal pairs are marked bias-unsusceptible (U). Each pair is assigned a value that identifies the original pair. In this example the first bit of the pair is used to uniquely identify which pair was encoded. Note that PUF response 412 can be recovered from string 420 which marks the high/low bias pairs and the values of the pairs.

Next the processing is split into processing the unsusceptible pairs (U) and processing the susceptible pairs (S). For the unsusceptible processing the susceptible pairs are treated as erasures. For the susceptible processing the unsusceptible pairs are treated as erasures (E). Erasures are basically placeholders that do not contribute to the processing, removing the values while preserving the ordering of the data.

In both parts of the process a secret is added to form noise reduction data. These secrets are independent of each other. These secrets can be encoded using an error correcting code and are added to the strings with erasures. In this example the value of the encoded secret is added by exclusive OR of the first bit of each pair in the secret with the value of the (un)susceptible pair. Erasures are neutral and do not contain values; they are therefore not influenced by this process.

String 431 shows PUF response 412 in which susceptible pairs are replaced by erasures. The bit pairs marked U in strings 420 and 431 is the low-bias first part of PUF response 412. String 432 are two first code words. In this case a repetition code of block size n=10 is used. The repetition code could also be part of a larger concatenated code, e.g., as inner code. For example, string 432 may have been obtained as the encoding of a first secret, in this case with value (0, 1). The first secret may be obtained from a random number generator. The sum of string 431 and the two code words 432 is shown in string 433. Note that adding an erasure to any bit remains an erasure. Adding 11 to a U0 or U1 flips it to U1 or U0, whereas adding 00 has no effect. An inner code with the property that it can be split into pairs of equal bits such as a repetition code has the advantage that an unequal pair remains unequal and an equal pair remain equal. Although this is convenient and helps to get small combined debasing/noise reduction data, it is not necessary. String 433 can be seen as noise reduction data for the first part of PUF response 412. Note that string 433 in this example has the same length as PUF response 412.

The same process is followed for the susceptible bits. String 441 shows PUF response 412 in which unequal pairs are replaced by erasures. The bit pairs marked S in strings 420 and 441 is the high bias susceptible second part of PUF response 412. String 432 are two second code words. The second code words 442 are chosen from the same error correction code as code words 432 but they are an encoding of a different secret. In this case, an encoding of the secret (1,0). String 443 shows the result of adding the second code words 442 to string 441.

Interestingly, the two partial sets of partial noise reduction data can be combined efficiently, filling in the erasure positions of one with the values of the other. To illustrate this first and second noise reduction data 433 and 443 are shown directly underneath each other. The erasures in the strings 433 and 443 are complementary and the first and second noise reduction data can be combined into a single noise reduction data for the first and second part. The combined noise reduction data is shown at 451. Note that bit encodings may be used instead of the letters S and U.

For example, it is possible to represent this noise reduction data 451 efficiently using binary format. Combined noise reduction data 452 shows the combined noise reduction data where the susceptible pairs are represented by a '0' and the binary value and the unsusceptible pairs are represented by a '1' and the binary value. Note that the combined data 451/452 contains both the debiasing data, as the U and S values indicate which bits are in the first part and which in the second part, the first noise reduction data, in the form of the other bit after a U, and the second noise reduction data, in the form of the other bit after an S. We may refer to string 451 as combined helper data. Note that the combined bit size of the debiasing data, first noise reduction data and second noise reduction data equals the bit size of the first noisy bit string.

For example, in such an advantageous packing of debiasing data, first noise reduction data and second noise reduction data, the debiasing data comprises only a single bit for each pair in the first sequence of bit pairs identifying the pair as low or high bias susceptible. The other bit in the pair may be used as noise reduction data. For example, in an embodiment the first noise reduction data comprises a single bit for each pair in the first part of the first noisy bit string, said bit indicating the offset between the pair in the first part of the first noisy bit string and a corresponding pair in the one or more first code words.

the second noise reduction data comprises a single bit for each pair in the second part of the first noisy bit string, said bit indicating the offset between the pair in the second part of the first noisy bit string and a corresponding pair in the one or more second code words.

FIG. 4 schematically show examples of a reconstruction procedure. The procedures illustrated with FIG. 4 may be executed, e.g., on an embodiment such as that illustrated with FIG. 1. This example continues from FIG. 3. Reconstruction takes place using a new noisy PUF string, e.g., a second PUF response. For reference, the original first PUF response obtained during enrollment is repeated in FIG. 4 with reference numeral 412. The new second PUF response obtained during reconstruction is show with reference numeral 514. The underlined bits in the PUF response show the locations where it differs from the enrollment PUF string 412. Note, that this information is not a-priori known in an actual reconstruction, and is only shown in FIG. 4 to explicate the reconstruction. For reference the combined debiasing/noise reduction data 451 is also shown in FIG. 4. The combined helper data 451 was produced during enrollment, and is required to reconstruct the secrets and (if desired) the enrollment PUF response.

The combined helper data 451 is split into partial helper data for the susceptible and the unsusceptible parts by introducing erasures again. The partial helper data is translated to a string of pairs. The unsusceptible helper data is translated to the pairs '01' and '10', where the value bit represents the first bit of the pair, translating 'U0' into '01' and 'U1' into '10'. The susceptible helper data is translated to the pairs '00' and '11', where the value bit represents the first bit of the pair, translating 'S0' into '00' and 'S1' into '11'. Erasures do not result in any value.

String 521 shows the unsusceptible partial helper data, e.g., first noise reduction data. String 522 shows the same information but herein the encoding U0 and U1 have been replaced by the corresponding unequal pairs. Erasures are not shown. The first noise reduction data 522 is added to the second PUF response 514 to obtain first noisy code words 523. Note that erasures in string 521/522 result in erasures in string 523. In addition to erasures, first noisy code words 523 also contains errors. Note that the second error in second PUF response 514 resulted in an error in the fifth pair of string 523; without the error in PUF response 514 that pair in string 523 would have been 00 instead of 10. Shown is the first noisy code words 523, e.g., the encoded first secret with noise. Since the first secret is encoded using an error correction code, it can be corrected to the original secret value. For the code used in the example the bit occurring most determines the result. That is repetition codes can be decoded using majority voting, ignoring erasures. More complicated codes have correspondingly more complicated error correction algorithms. Finally, two first corrected bits 524 are obtained. Instead of the two first corrected bits also the original first code words could have been obtained. If a concatenated code is used, then instead of a hard decoding to bits 524 a soft decoding could be used. The soft decoding could be used as a starting point to error correct the outer code (not shown in FIGS. 3 and 4).

The process for error correcting the bias susceptible part is similar. Shown at 531 is the susceptible part of the combined helper data, with erasures replacing the low-bias first part. String 532 is the same but translated to a noise reduction data 532. In string 533 the noise reduction data has been added to PUF response 514. The result 533 shows a number of erasures and in this case 2 errors. Majority decoding correctly gives the encoded secret 534.

Strings 524 and 534 are first and second corrected bits and could be used to generate one or more keys. For example, the two strings could be concatenated and hashed to generate a single high entropy key for normal bias values and which is protected against entropy loss in case of high bias.

Figure 5:
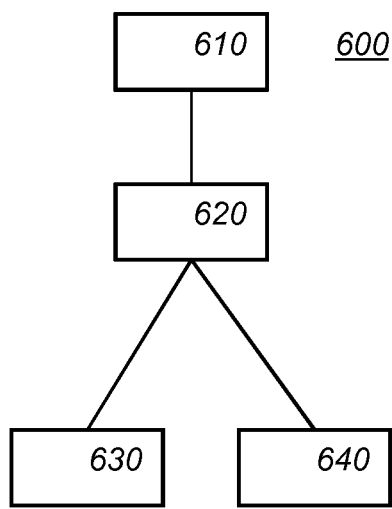

FIG. 5 schematically shows an example of an embodiment of an electronic enrollment method 600. Method 600 enrolls a device, such as device 100, for later determining of a cryptographic key. Enrollment method 600 comprises producing 610 a first noisy bit string 112 from a physically unclonable function PUF 110 determining 620 debiasing data 142 from the first noisy bit string, the debiasing data marking a first part 121 of the first noisy bit string 112 as low bias susceptible, and marking bits in a second part 122 of the first noisy bit string 112 as high bias susceptible, determining 630 a first noise reduction data 131 for the first part, and determining 640 a second noise reduction data 132 for the second part, noise reduction data allowing later correction during the reconstruction phase of differences between the second noisy bit string and the first noisy bit string. Method 600 may further comprise storing the debiasing, first noise reduction data and second noise reduction data.

Figure 6:
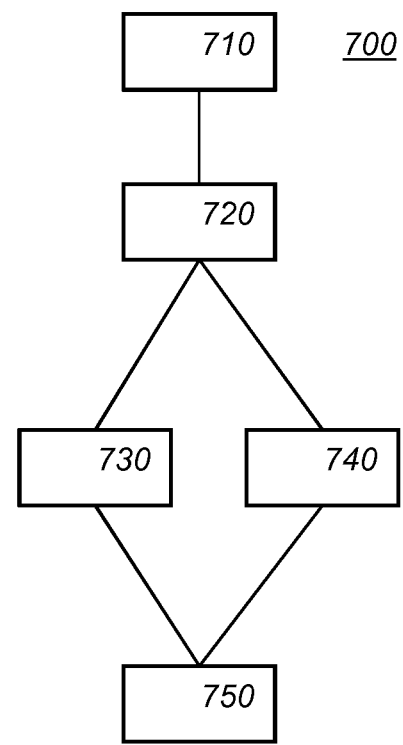

FIG. 6 schematically shows an example of an embodiment of an electronic reconstruction method 700. Method 700 determines a cryptographic key based on debiasing data, and first and second noise reduction data, e.g., as determined in an enrollment method such as method 600. Method 700 comprises producing 710 a second noisy bit string 112 from a physically unclonable function PUF 110, identifying 720 a first part 151 and a second part 152 in the second noisy bit string 114 based on debiasing data, performing 730 a first correction of differences between the first part of the second noisy bit string and the first part of the first noisy bit string based on the first noise reduction data thus obtaining first corrected bits 171, and performing 740 a second correction of differences between the second part of the second noisy bit string and the second part of the first noisy bit string based on the second noise reduction data thus obtaining second corrected bits 172, wherein the first correction and second correction are independent from each other, the debiasing data, first noise reduction data and second noise reduction data being obtained from an enrollment method as in claim 13, and computing 750 at least one cryptographic key from the first corrected bits and the second corrected bits, e.g., key 181 and key 182 or key 183 or key 184 and 185 or key 186 and 187.

Method 600 and 700 may be executed after one another, e.g., in a combined enrollment and reconstruction method.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, elements 630 and 640 or elements 730 and 740 may be executed, at least partially, in parallel. Moreover, a given step may not have finished completely before a next step is started.

A method according to the invention may be executed using software, which comprises instructions for causing a processor system to perform method 600 or 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
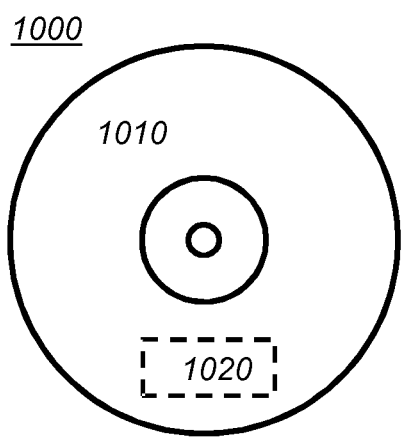

FIG. 7a shows a computer readable medium 1000 having a writable part 1010 comprising a computer program 1020, the computer program 1020 comprising instructions for causing a processor system to perform a method or enrollment and/or reconstruction, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method or enrollment and/or reconstruction.

Figure 7B:
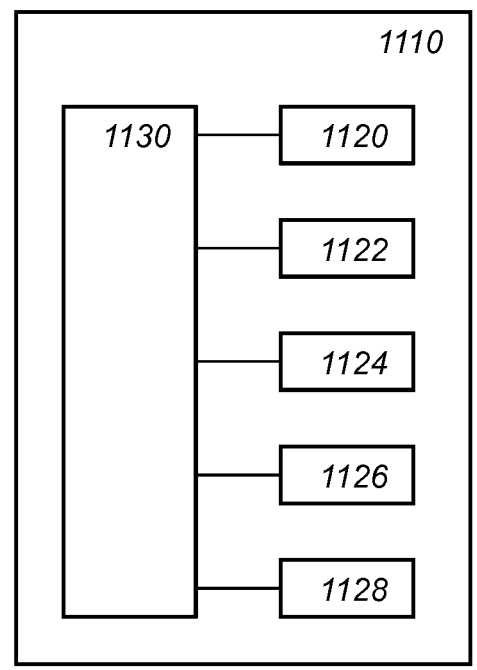

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the cryptographic device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. An electronic cryptographic device arranged to determine a cryptographic key, the cryptographic device being arranged for an enrollment phase and a later reconstruction phase, the cryptographic device comprising:
a physically unclonable function arranged to produce a first noisy bit string during the enrollment phase and a second noisy bit string during the reconstruction phase, and
a processor circuit configured to
determine, during the enrollment phase, debiasing data from the first noisy bit string, the debiasing data marking a first part of the first noisy bit string as low bias susceptible, and marking a second part of the first noisy bit string as high bias susceptible,
determine during the enrollment phase a first noise reduction data for the first part, and a second noise reduction data for the second part, noise reduction data allowing later correction during the reconstruction phase of differences between the second noisy bit string and the first noisy bit string,
identify during the reconstruction phase a first part and a second part in the second noisy bit string based on the debiasing data,
perform a first correction of differences between the first part of the second noisy bit string and the first part of the first noisy bit string based on the first noise reduction data thus obtaining first corrected bits, and perform a second correction of differences between the second part of the second noisy bit string and the second part of the first noisy bit string based on the second noise reduction data thus obtaining second corrected bits, wherein the first correction and second correction are independent from each other,
compute at least one cryptographic key from the first corrected bits and the second corrected bits.

2. An electronic cryptographic device as in claim 1, wherein the processor circuit is configured to select, during the enrollment phase, one or more first code words from an error correcting code and one or more second code words from an error correcting code, wherein
determining a bit of the first noise reduction data comprises computing the offset between a corresponding bit in the first part of the first noisy bit string and a corresponding bit in the one or more first code words, and
determining a bit of the second noise reduction data comprises computing the offset between a corresponding bit in the second part of the first noisy bit string and a corresponding bit in the one or more second code words.

3. An electronic cryptographic device as in claim 2, wherein the one or more first code words are as long or longer as the first noisy bit string, wherein the one or more second code words are as long or longer as the first noisy bit string, each bit in the first noisy bit string corresponding to a bit in the one or more first code words and to a bit in the one or more second code words.

4. An electronic cryptographic device as in claim 2, wherein the processor circuit is configured to:
determine the offsets between the first noisy bit string and the one or more first code words only for the bits in the first part of the first noisy bit string, and
determine the offsets between the first noisy bit string and the one or more second code words only for the bits in the second part of the first noisy bit string.

5. An electronic cryptographic device as in claim 2, wherein the processor circuit is arranged to select the one or more first or second code words from the first or second error correcting code by encoding one or more further code words from a further error correcting code.

6. An electronic cryptographic device as in claim 2, wherein the error correcting code is a concatenated code wherein the inner code is a repetition code.

7. An electronic cryptographic device as in claim 1, wherein performing a first correction of differences comprises;
  obtaining one or more noisy first code words, by applying the first noise reduction data to bits in the first part of the second noisy bit string, and marking as erasures-bits, the bits in the one or more noisy first code words corresponding to bits in the second part of the second noisy bit string,
  correcting said one or more noisy first code words using an error correcting algorithm, and/or wherein performing a second correction of differences comprises
  obtaining one or more noisy second code words, by applying the second noise reduction data to bits in the second part of the second noisy bit string, and marking as erasures-bits, the bits in the one or more noisy second code words corresponding to bits in the first part of the second noisy bit string, and
  correcting said one or more noisy second code words using an error correcting algorithm.

8. An electronic cryptographic device as in claim 1, wherein the first and second noisy bit string are partitioned in a first and second sequence of bit pairs respectively, the processor circuit being configured to identify bits in unequal bit pairs in the first sequence of bit pairs as low bias susceptible, and to identify bits in equal bit pairs in the first sequence of bit pairs as high bias susceptible.

9. An electronic cryptographic device as in claim 8, wherein
  the debiasing data comprises a single bit for each pair in the first sequence of bit pairs identifying the pair as low or high bias susceptible,
  the first noise reduction data comprises a single bit for each pair in the first part of the first noisy bit string, said bit indicating the offset between the pair in the first part of the first noisy bit string and a corresponding pair in one or more first code words, and
  the second noise reduction data comprises a single bit for each pair in the second part of the first noisy bit string, said bit indicating the offset between the pair in the second part of the first noisy bit string and a corresponding pair in the one or more second code words.

10. An electronic cryptographic device as in claim 1, wherein the combined bit size of the debiasing data, first noise reduction data and second noise reduction data equals the bit size of the first noisy bit string.

11. An electronic cryptographic device as in claim 1, wherein the processor circuit is arranged to compute a single cryptographic key from at least part of the first corrected bits and at least part of the second corrected bits.

12. An electronic cryptographic device as in claim 1, wherein the processor circuit is arranged to compute a first cryptographic key from at least part of the first corrected bits and a second cryptographic key from at least part of the second corrected bits.

* * * * *